Sept. 27, 1960　　　M. A. DE CICCO ET AL　　　2,953,907
AIR CONDITIONER FOR AUTOMOBILES
Filed Dec. 19, 1957　　　　　　　　　　　4 Sheets-Sheet 1

INVENTOR.
MICHAEL A. DE CICCO
EDWARD W. JERGER
BY
*M. A. Hobbs*
ATTORNEY

Sept. 27, 1960 M. A. DE CICCO ET AL 2,953,907
AIR CONDITIONER FOR AUTOMOBILES
Filed Dec. 19, 1957 4 Sheets-Sheet 2
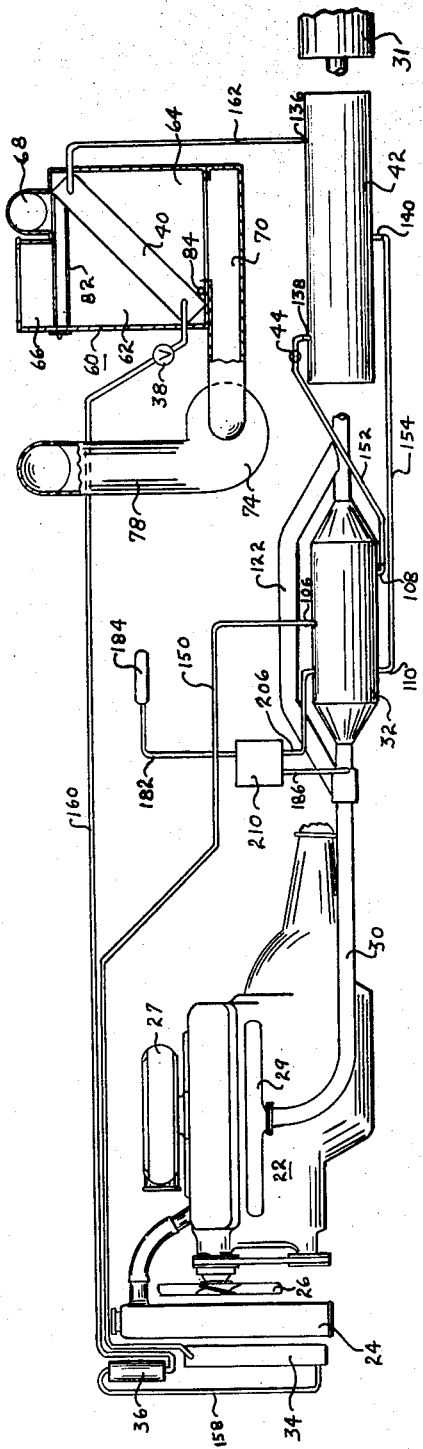
INVENTOR.
MICHAEL A. DE CICCO
EDWARD W. JERGER
BY
*m. a. Hobbs*
ATTORNEY Sept. 27, 1960   M. A. DE CICCO ET AL   2,953,907
AIR CONDITIONER FOR AUTOMOBILES Filed Dec. 19, 1957   4 Sheets-Sheet 3

INVENTOR.
MICHAEL A. DE CICCO
EDWARD W. JERGER
BY *M. A. Hobbs*

ATTORNEY

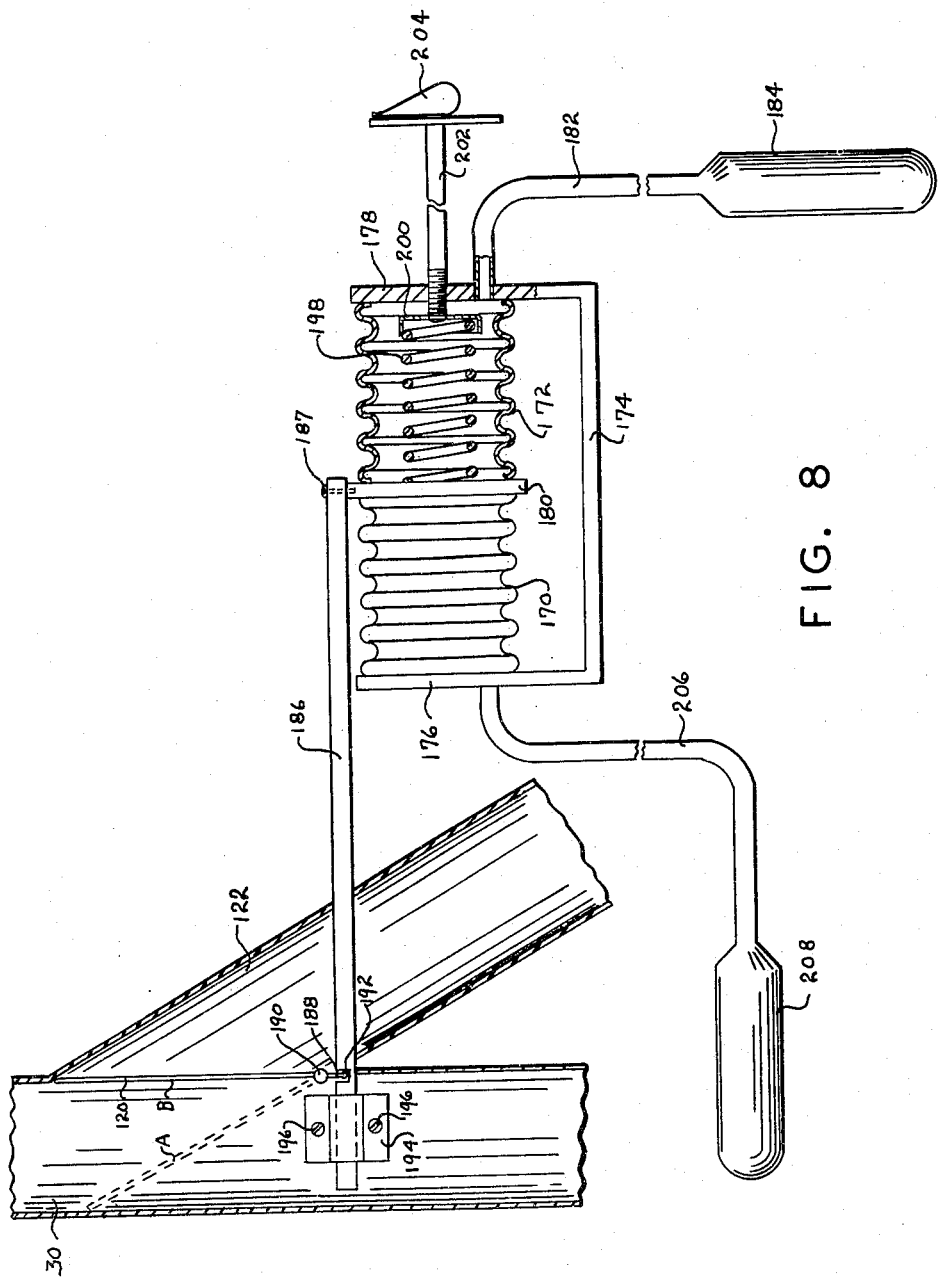

United States Patent Office  2,953,907
Patented Sept. 27, 1960

2,953,907

AIR CONDITIONER FOR AUTOMOBILES

Michael A. De Cicco, 622 E. Oakside, and Edward W. Jerger, 1261 Woodward Ave., both of South Bend, Ind.

Filed Dec. 19, 1957, Ser. No. 703,855

7 Claims. (Cl. 62—148)

The present invention relates to air conditioning systems and more particularly to improvements in air conditioning systems using the absorption principle, for automobiles, trucks and buses.

One of the principal objects of the present invention is to provide an air conditioning system which can readily be installed on automobiles in the after market field without requiring any substantial changes in the vehicle equipment, and which will give long, trouble free service.

Another object of the invention is to provide a relatively simple and easily and accurately controlled air conditioning unit for automobiles, which efficiently utilizes the engine exhaust heat for its source of operating energy without interfering with the normal operation of the engine and without placing any additional demands on the engine.

Still another object of the invention is to provide an air conditioning system of the absorption type for automobiles and the like, which is regulated automatically in response to the temperature in the compartment being cooled and in the generating system, and which is infinitely variable over the entire range of normal operating temperatures.

Further objects and advantages of the present invention will become apparent from the following description and accompanying drawings, wherein:

Figure 2 is an elevational view of the parts of the present air conditioning system and the cooperating parts of an automobile, in which the parts have been rearranged to better show their operational relationship;

Figure 3 is a perspective, partial cross sectional view of the generator of our air conditioning system;

Figure 8 is a partial cross sectional view of the control mechanism for our air conditioning system.

Figure 1:
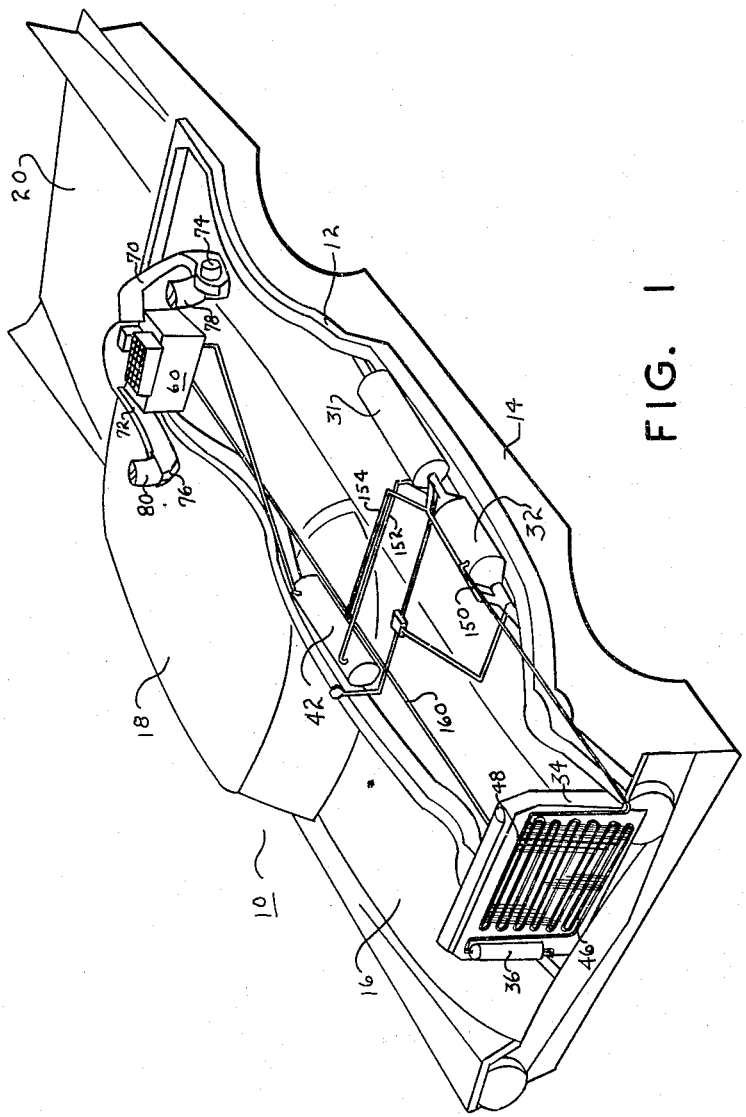
Figure 1 is a perspective view of the frame of an automobile and our air conditioning system mounted thereon, with the body of the automobile shown, in outline form, on the frame.
Figure 5:
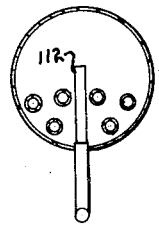
Figure 5 is a vertical cross sectional view of the generator taken on line 5—5 of Figure 4.
Figure 4:
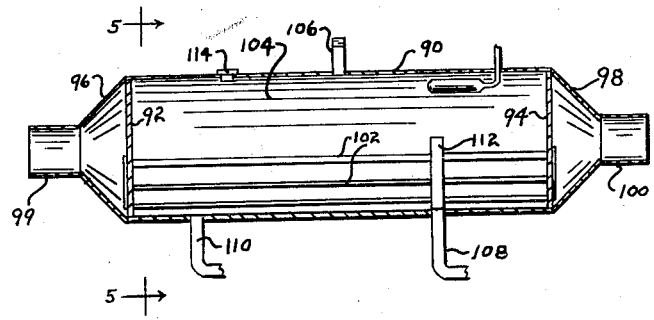
Figure 4 is a vertical cross sectional view taken longitudinally through the generator shown in Figure 3.

Referring more specifically to the drawings and to Figure 1 in particular, our air conditioning system is shown mounted in an automobile 10 having a frame 12 and a body 14 with an engine, passenger and trunk compartments 16, 18 and 20, respectively, mounted on the frame and shown in outline form so that the relative locations of the component parts of our air conditioning system can be readily seen. The present air conditioning system is designed for use on any passenger car, bus, truck and trailer driven by an internal combustion engine. Throughout the specification and depending claims the term "vehicle" will be used to include any type of vehicle in which the present system can be satisfactorily operated; however, for convenience the present description will be directed primarily to passenger cars as generally illustrated in Figure 1.

Figure 7:
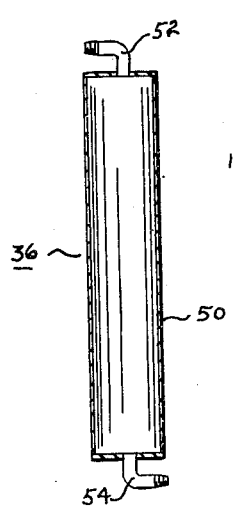
Figure 7 is a vertical cross sectional view of the receiver used in our system.
Figure 6:
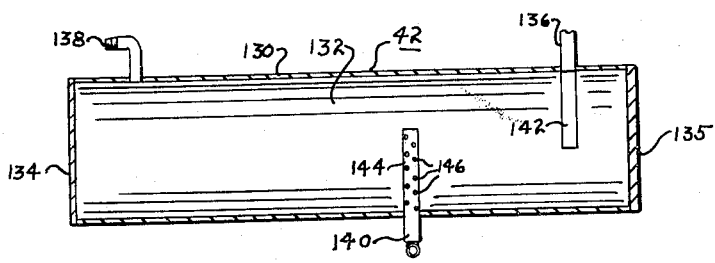
Figure 6 is a vertical cross sectional view taken longitudinally through the absorber used in our air conditioning system.

In Figure 2 the parts of an automobile essential for the operation of the present air conditioning system are shown, together with the component parts of our system which have been partially rearranged in order to better illustrate the operation of the system. The figure illustrates a conventional internal combustion engine 22 having a radiator 24, fan 26, air cleaner 27 and exhaust manifold and pipe 29 and 30. A muffler, shown in part at numeral 31, is connected to the exhaust pipe 30. Our air conditioning system is an absorption type employing a liquid absorbent and containing a generator 32, condenser coils 34, receiver 36, expansion valve 38, evaporator coils 40, absorber 42 and pressure reducing valve 44. The condenser and evaporator coils, receiver and expansion valve, while important components of the present system, may be considered for the purpose of the present invention as conventional or standard parts and will not require any detailed description here for a full understanding of the present invention. The construction of the condenser coil can be seen in Figure 1 consisting of a series of reversed coils 46 having a number of closely spaced fins 48 for dissipating the heat from the solution in the coils. This coil is located at some position on the vehicle where it will receive a substantial flow of air at all times while the vehicle is in operation. It is shown mounted on the frame in front of the vehicle radiator and hence is subjected to the air flow created both by motion of the vehicle and by the engine fan 26. The receiver tank 36 consists of cylinder 50 as seen in Figure 7 with an inlet connection 52 at the top and an outlet connection 54 at the bottom.

The evaporator coil 40 which is similar in construction to the condenser coil is mounted in a housing 60 disposed in the rear of the automobile, preferably in the forward portion of trunk compartment 20. The housing is completely separated into an air inlet chamber 62 and an air outlet chamber 64 by coil 40, the former chamber being connected to the passenger compartment of the vehicle by a duct 66 and to the atmosphere for fresh air by a duct 68, and the latter chamber being connected to the passenger compartment by ducts 70 and 72, blowers 74 and 76, and discharge ducts 78 and 80 for blowers 74 and 76, respectively. Fresh air duct 68 is preferably provided with a shutter or valve (not shown) which can be used to regulate the intake and completely close the duct if desirable. Ducts 78 and 80 are connected with outlets located at suitable points in the passenger compartment and preferably provided with deflectors or diffusers for maximum distribution of the conditioned air. The blowers are driven electrically from the vehicle battery and may be either manually or thermostatically controlled using standard control equipment. An air filter 82 is preferably interposed between the outlets 66 and 68 and coil 40, and drain 84 is provided in the bottom of the housing to remove the water formed by condensation of moisture on the coil.

Generator 32 is so constructed and designed as to obtain maximum operating efficiency from the available heat from the engine exhausts without interfering with the operation of the engine and consists of a cylindrical wall 90 enclosed at the ends by plates 92 and 94 joined integrally to the side walls, and conical members 96 and 98 connected to the ends of the cylindrical portion and adapted to be connected into exhaust pipe 30 by nipples 99 and 100, respectively. A plurality of relatively small tubes 102 extend longitudinally through chamber 104 of the generator and connect the interior of conical member 96 with the interior of conical member 98. These tubes are spaced nearly uniformly from one another and are confined to the lower half of the chamber 104. An outlet connection 106 for gaseous refrigerant is provided in the top of chamber 104 and outlet and inlet connections 108 and 110, respectively, for circulation of the absorbent to absorber 42 are provided in the bottom of chamber 104, the absorbent being withdrawn from the chamber at the top of the liquid therein through tube 112 connected with connection 108 and returned to the chamber at the bottom through connection 110. A plug 114 is provided in the top of the generator for use in filling and servicing the unit.

The generator is mounted under the body of the automobile on the frame and is connected into the exhaust pipe as a section thereof anterior to the muffler. When the generator is in operation the hot exhaust gases pass from pipe 30 through conical member 96, tubes 102 and conical member 98, and are discharged into the exhaust pipe adjacent the intake of the muffler. The amount of heat supplied to the generator by the exhaust gases is controlled by a valve 120 in the exhaust pipe anterior to the generator and a by-pass conduit 122 connecting the exhaust pipe at the valve with the inlet to the muffler. When it is desired to use the air conditioner, valve 120 is first moved to the position shown in Figure 8, completely closing by-pass conduit 122 so that all of the exhaust gases will pass through the generator. As the passenger compartment in the vehicle reaches the desired temperature the valve is moved to a partially closed position to deflect a portion of the exhaust gases through the by-pass and thus decrease the amount of heat supplied to the generator. The valve will be shifted to various points between open and closed positions as required to maintain the desired temperature. When the air conditioning system is to be completely shut off, valve 120 is moved to the position shown in broken lines in Figure 8, directing all of the exhaust gases through by-pass conduit 122.

The absorber unit 42 is shown in Figure 1 mounted on the frame beneath the body and on the opposite side of the vehicle from the generator and consists of walls 130 forming a cylindrical chamber 132 closed by end plates 134 and 135. Inlet connections 136 and 138 are provided in the top of the chamber for admitting the refrigerant and absorbent, respectively, and an outlet connection 140 for discharging the strong absorbent-refrigerant solution back to the generator. A tube 142 is connected to the refrigerant inlet connection 136 and extends to a point below the surface of the liquid absorbent so that the refrigerant will be discharged directly into and readily absorbed by the absorbent. A tube 144 is connected to the absorbent outlet connection and is provided with a number of small holes 146 so that the absorbent being withdrawn from the absorber will be substantially constant in the amount of refrigerant dissolved or absorbed therein.

The present air conditioning system is designed to operate safely under all conditions and to be harmless in case of failure or accident involving the vehicle or air conditioner. The fluids employed in the system consist of the combination of dichlorodifluoromethane as the refrigerant and ethyl-ether of diethylene glycol acetate as the absorbent. The escaping of these fluids into the passenger compartment will not cause serious harm to the individuals therein in case of a break in the evaporator coils or in the lines leading to or from the coils, and the generator in which the fluids are raised to elevated temperatures is located completely outside of the compartment so that the hot fluids can not reach the passengers in the event of an accident.

The generator 32 mounted beneath the vehicle body, as described, is connected to the condenser coil 34 in front of the engine radiator by a conduit 150 and with the absorber by a conduit 152 for the weak absorbent solution and conduit 154 for return of the strong absorbent-refrigerant solution, conduit 152 containing the pressure reducing valve 44 of conventional construction. Since, in the installation shown in Figure 1, the generator and absorber are located on opposite sides of the vehicle and are connected with a relatively small tube for delivering the weak absorbent to the absorber, the absorbent is cooled sufficiently before it reaches the absorber that it will absorb a satisfactory amount of refrigerant before returning to the generator to render the system efficient; however, for certain operating conditions it may be desirable to increase the efficiency by inserting a small cooling coil in conduit 152.

The evaporator coil 40 is connected to the condenser coil by conduit 158, receiver tank 36 and conduit 160, and with the absorber by conduit 162. The expansion valve 38 which may be of standard or conventional construction is in conduit 160 adjacent the evaporator coils. Other components such as a rectifier and analyzer (not shown) may be included in the system and connected into conduit 150.

The present system is automatically controlled over a wide range of temperatures and is infinitely variable over the entire range, so that any desired temperature within the range can be selected and maintained with continuous operation of the refrigerator system. The control mechanism for the system is shown in detail in Figure 8 and consists of two opposed bellows 170 and 172 supported by a bracket 174, the former bellows being rigidly secured to arm 176 of the bracket and the latter being rigidly secured to arm 178 of the bracket. Arms 176 and 178 form sealing members for the outside ends of the bellows. The adjacent ends of the bellows are secured to and sealed by a movable disc-shaped plate 180 which is adapted to shift position to the right or left as the pressures in the two bellows vary relative to one another. Bellows 172 is connected by a tube 182 to a bulb 184 located in the passenger compartment of the vehicle where it can sense the temperature of the air in the compartment, and the bellows, bulb and tube are filled with a fluid, the vapor pressure of which expands and contracts with changes in temperature. As the temperature in the passenger compartment increases the vapor pressure in the bulb and bellows 172 increases moving plate 180 to the left, as viewed in Figure 8, and as the temperature in the compartment decreases the vapor pressure decreases causing plate 180 to move to the right. Plate 180 is connected to valve 120 controlling the flow of exhaust gases to the generator by a rod 186 attached at one end to plate 180 by a screw 187 and connected at the other end to valve 120 by a small lever 188 secured to valve shaft 190 and disposed in a slot 192 in the side of rod 186. Valve 120, valve shaft 190 and lever 188 are rigidly connected to one another so that they move in unison; hence, when rod 186 is moved to the right or left, lever 188 with its free end in slot 192 is moved to the right or left pivoting valve 120 to and from the valve positions marked A and B. The end of rod 186 opposite the bellows is slidingly supported adjacent valve shaft 190 by a fixture 194 secured by screws 196 to exhaust pipe 30.

In order to vary the temperature to be maintained in the passenger compartment, a coil spring 198 is placed inside bellows 172, seating at one end against plate 180 and at the other end in a spring retainer 200 spaced from arm 178. Retainer 200 is supported by and movable to the right and left by a rod 202 threaded through arm 178 and extending to the passenger compartment where a hand 204 on the rod can be rotated to screw the rod either inwardly or outwardly to increase or decrease the compression on spring 198. As the compression on the spring is increased a lower temperature will be maintained in the compartment and conversely as the compression on the spring is decreased a higher temperature will be maintained in the compartment. As a safety feature and as a means of making the unit more responsive to conditions, bellows 170 is connected by a tube 206 to a bulb 208 disposed in the upper part of the generator so that the temperature therein will be sensed and the valve 120 regulated to prevent over-heating of the unit. The bulb, tube and bellows 170 are filled with a temperature responsive fluid which increases the pressure in bellows 170 as the temperature in the generator increases and tends to move plate 180 to the right and thus tends to move valve 120 in the counterclockwise direction to decrease the amount of exhaust gases entering the generator. This arrangement also makes the unit more responsive to the demands of the unit in the passenger compartment by maintaining a rather consistent operating temperature in the generator rather than permitting the temperatures in the generator to fluctuate to the point where it operates as an off-on unit. When the system is to be shut off, rod 202 is rotated outwardly by hand 204 sufficiently to relieve the compression of spring 198 to permit valve 120 to fully move to position A. With the valve in this position all of the exhaust gases are directed through by-pass 122 thus permitting the generator to cool and cease to generate gaseous refrigerant. The bellows are preferably enclosed in a housing 210 and spaced from heated parts, such as the exhaust pipe and generator, so that they will not be affected by temperature changes other than those sensed by the two bulbs 184 and 208.

With the present air conditioning system shut off, and with the passenger compartment warm and the generator cold, the pressure in bulb 184 and bellows 172 is relatively high and the pressure in bulb 208 and bellows 170 is relatively low, thus creating a differential in pressures between the bellows, urging plate 180 to the left. This differential in pressure, however, is not in itself sufficient to move valve 120, hence the valve remains in position A with the system inoperative. In order to place the system in operation, hand 204 is rotated in the direction to compress spring 198 sufficiently that it, in conjunction with the differential in pressure between the two bellows, will move plate 180 to its extreme left hand position and through rod 186 will move valve 120 to position B where by-pass 122 will be fully closed. With the by-pass fully closed, all of the hot exhaust gases pass through the generator giving full capacity to the generator. As the refrigerant boils off, it passes in the gaseous state through conduit 150 to condenser 34, thence in the liquid state through receiver tank 36, conduit 160 to expansion valve 38 and again as a gas through evaporator coils 40 and conduit 162 to absorber 42. In the absorber, the refrigerant dissolves in the absorbent received from the generator through conduit 152 and is returned with the absorbent to the generator through conduit 154. When the temperature in the passenger compartment approaches the degree selected by hand 204, the pressure in bulb 184 and bellows 172 decreases sufficiently to permit valve 120 to move to an intermediate position between positions A and B, thus diverting a portion of the exhaust gases through the by-pass and permitting the generator to partially cool. An intermediate position of valve 120 is maintained throughout the operation of the system, the position varying, however, to meet changes in the condition and demand in the passenger compartment as sensed by bulb 184. The system remains continuously in operation until it is completely shut off by rotating hand 204 sufficiently to relieve the compression on spring 198 required to move valve 120 from position A.

In the event the generator tends to become overheated, which condition is most likely to occur when the temperature in the passenger compartment is being initially lowered, the excess temperature is sensed by bulb 208 and in response thereto, bellows 170 moves plate 180 slightly to the right and valve 120 a few degrees toward position A, thus decreasing the amount of hot exhaust gases passing through the generator.

The present generator is particularly adapted to be built as an integral part of the vehicle muffler and, in its present form, will function effectively as a muffler. In one arrangement, conical member 98 is eliminated and the cylindrical part of the generator attached directly to the forward end of the muffler housing, permitting the exhaust gases to discharge directly from tubes 102 into the muffler. In this modification, the discharge end of the by-pass conduit is connected directly into the muffler.

Several variations in the air conditioning system have been mentioned hereinbefore. Other modifications and changes may be made without departing from the scope of the present invention.

We claim:
1. In an air conditioning system for a vehicle having an engine with an exhaust pipe: a generator having flow passages connected to said pipe for receiving gases therefrom and having a chamber for liquid absorbent and refrigerant, a conduit connected to said pipe and by-passing said generator, a valve for controlling the flow of exhaust gases through said conduit and generator, a control for said valve having two chambers with a movable wall therebetween, a bulb disposed in the space to be cooled and connected to one of said control chambers, a bulb disposed in the generator and connected to the other control chamber, and a linkage connecting said movable wall with said valve.

2. In an air conditioning system for a vehicle having an engine with an exhaust pipe: a generator having flow passages connected to said pipe for receiving gases therefrom and having a chamber for a liquid absorbent and a refrigerant, a conduit connected to said pipe and by-passing said generator, a valve for controlling the flow of exhaust gases through said conduit and generator, a control for said valve having two chambers with a movable wall therebetween, a bulb disposed in the space to be cooled and connected to one of said control chambers, a bulb disposed in the generator and connected to the other control chamber, a linkage connecting said movable wall with said valve, a spring means urging said movable wall in the direction to cause said valve to close said conduit, and adjustment means for said spring to vary the differential of pressure between said control chambers required to move said valve in the direction to open said conduit.

3. In an air conditioning system for a vehicle having an engine with an exhaust pipe: a generator having a horizontally disposed container for liquid absorbent and refrigerant, members forming chambers at each end of said container connected with each other, a means connecting one of said end chambers with the exhaust pipe anterior to said generator, a means connecting the other of said end chambers with the exhaust pipe posterior to said generator, a conduit connecting the exhaust pipe anterior to said generator with the exhaust pipe posterior to said generator, a valve for controlling the flow of exhaust gases through said conduit and generator, a control for said valve having two chambers with a movable wall therebetween, a bulb disposed in the space to be cooled and connected to one of said control chambers, a bulb disposed in said container and connected to the other control chamber, a linkage connecting said movable wall with said valve, and a spring means urging said movable wall in the direction to cause said valve to close said conduit.

4. In an air conditioning system for a vehicle having an engine with an exhaust pipe: a generator having a horizontally disposed container for liquid absorbent and refrigerant, members forming chambers at each end of said container connected with each other, a means connecting one of said end chambers with the exhaust pipe anterior to said generator, a means connecting the other of said end chambers with the exhaust pipe posterior to said generator, a conduit connecting the exhaust pipe anterior to said generator with the exhaust pipe posterior to said generator, a valve for controlling the flow of exhaust gases through said conduit and generator, a control for said valve having two chambers with a movable wall therebetween, a bulb disposed in the space to be cooled and connected to one of said control chambers, a bulb disposed in said container and connected to the other control chamber, a linkage connecting said movable wall with said valve, a spring means urging said movable wall in the direction to cause said valve to close said conduit, an absorber having a chamber, a conduit connecting the upper portion of said container with the upper portion of the absorber chamber, and a conduit connecting the lower portion of said absorber chamber with the lower portion of said container.

5. In an air conditioning system for a vehicle having an engine with an exhaust pipe: a generator having a horizontally disposed container for liquid absorbent and refrigerant, end plates closing the ends of said container, a plurality of tubes extending longitudinally through said container in the lower half thereof, members forming chambers at each end of said container connected with each other through said tubes, a means connecting one of said end chambers with the exhaust pipe anterior to said generator, a means connecting the other of said end chambers with the exhaust pipe posterior to said generator, a conduit connecting the exhaust pipe anterior to said generator with the exhaust pipe posterior to said generator, a valve for controlling the flow of exhaust gases through said conduit and generator, a control for said valve having two chambers with a movable wall therebetween, a bulb disposed in the space to be cooled and connected to one of said control chambers, a bulb disposed in said container and connected to the other control chamber, a linkage connecting said movable wall with said valve, a spring means urging said movable wall in the direction to cause said valve to close said conduit, and adjustment means for said spring to vary the differential of pressure between said control chambers required to move said valve in the direction to open said conduit.

6. In an air conditioning system for a vehicle having an engine with an exhaust pipe: a generator having a horizontally disposed container for liquid absorbent and refrigerant, plates closing the ends of said container, a plurality of tubes extending longitudinally through said container in the lower half thereof, members forming chambers at each end of said container connected with each other through said tubes, a means connecting one of said end chambers with the exhaust pipe anterior to said generator, a means connecting the other of said end chambers with the exhaust pipe posterior to said generator, a conduit connecting the exhaust pipe anterior to said generator with the exhaust pipe posterior to said generator, a valve for controlling the flow of exhaust gases through said conduit and generator, a control for said valve having two chambers with a movable wall therebetween, a bulb disposed in the space to be cooled and connected to one of said control chambers, a bulb disposed in said container and connected to the other control chamber, a linkage connecting said movable wall with said valve, a spring means urging said movable wall in the direction to cause said valve to close said conduit, adjustment means for said spring to vary the differential of pressure between said control chambers required to move said valve in the direction to open said conduit, an absorber having a chamber, a conduit connecting the upper portion of said container with the upper portion of the absorber chamber, and a conduit connecting the lower portion of said absorber chamber with the lower portion of said container.

7. In an air conditioning system for a vehicle having an engine with an exhaust pipe: a generator having a horizontally disposed container for liquid absorbent and refrigerant, members forming chambers at each end of said container connected with each other, a means connecting one of said end chambers with the exhaust pipe anterior to said generator, a means connecting the other of said end chambers with the exhaust pipe posterior to said generator, a conduit connecting the exhaust pipe anterior to said generator with the exhaust pipe posterior to said generator, a valve for controlling the flow of exhaust gases through said conduit and generator, a control for said valve having two chambers with a movable wall therebetween, a bulb disposed in the space to be cooled and connected to one of said control chambers, a bulb disposed in said container and connected to the other control chamber, a linkage connecting said movable wall with said valve, a spring means urging said movable wall in the direction to cause said valve to close said conduit, an absorber having a chamber, a conduit connecting the upper portion of said container with the upper portion of the absorber chamber, a conduit connecting the lower portion of said absorber chamber with the lower portion of said container, condenser coils, a conduit connecting the upper portion of said container with said condenser coils, evaporator coils, a conduit connecting said condenser coils with said evaporator coils, an expansion valve in said last mentioned conduit, and a conduit connecting said evaporator coils with said absorber below the normal level of the absorbent therein.

References Cited in the file of this patent

UNITED STATES PATENTS

| | | |
|---|---|---|
| 1,750,336 | Terry | Mar. 11, 1930 |
| 2,009,067 | Mulholland | July 23, 1935 |
| 2,027,057 | Munters | Jan. 7, 1936 |
| 2,068,333 | Krummell | Jan. 19, 1937 |
| 2,177,380 | Andersson | Oct. 24, 1939 |
| 2,216,589 | Grooms | Oct. 1, 1940 |
| 2,667,040 | Keating | Jan. 26, 1954 |
| 2,783,622 | Bourassa | Mar. 5, 1957 |

FOREIGN PATENTS

| | | |
|---|---|---|
| 515,552 | Germany | Jan. 7, 1931 |